United States Patent [19]
Van Der Roer

[11] 3,780,885
[45] Dec. 25, 1973

[54] DEVICE FOR PLACING CUPS ON A MOVING CARRIER MEMBER

[75] Inventor: Humphrey Alphons Victor Van Der Roer, Freiburg, Switzerland

[73] Assignee: Polytype AG., Freiburg, Switzerland

[22] Filed: Aug. 31, 1972

[21] Appl. No.: 285,455

[30] Foreign Application Priority Data
Sept. 9, 1971   Switzerland..................... 013208/71

[52] U.S. Cl.......... 214/8.5 A, 198/22 R, 214/1 BD, 214/1 BH, 214/8.5 C, 221/21 D, 221/225
[51] Int. Cl............................................ B65g 59/10
[58] Field of Search..................... 214/8.5 A, 8.5 C, 214/1 BD, 1 BH, 1 BA, 1 BC; 221/210, 224, 225, 226, 230, 232; 198/22 R

[56] References Cited
UNITED STATES PATENTS
2,927,343   3/1960   Soderquist...................... 214/1 BD
3,240,356   3/1966   Hill................................. 214/1 BD

*Primary Examiner*—Gerald M. Forlenza
*Assistant Examiner*—George F. Abraham
*Attorney*—David Toren et al.

[57] ABSTRACT

In transferring cups from a stationary stack of nested cups to a moving carrier member, such as a mandrel shaped to conform to the interior of the cup, a pair of pivotally mounted arms with releasable gripping members at their ends pick-up cups singly, and under a spring action, swing the cups through an arc into the path of the carrier member. As each cup is swung toward the carrier member, the plane of its opening assumes an oblique angular orientation relative to the axis of the carrier member so that the carrier member enters the cup opening and removes the cup from the gripping members. In addition, another pivotally mounted spring biased member follows the movement of the cup and urges it onto the carrier member after the cup has been displaced from the gripping member.

11 Claims, 8 Drawing Figures

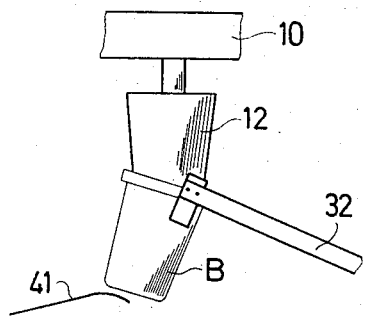
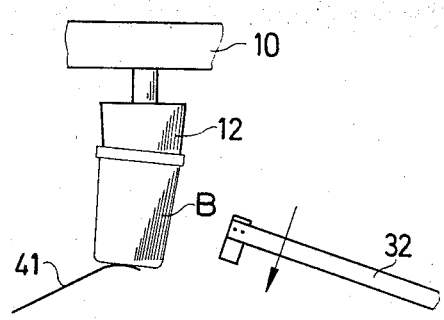
Fig. 4    Fig. 5
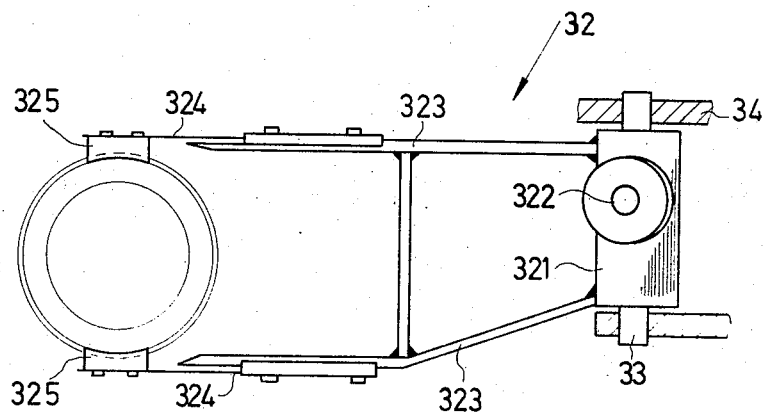
Fig. 6
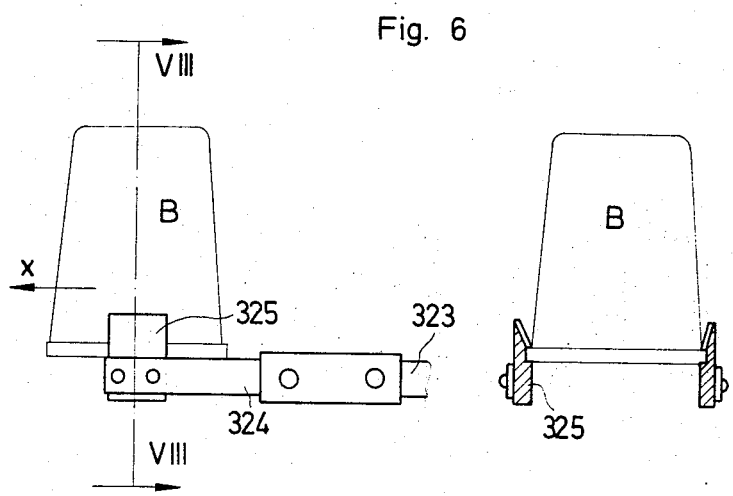
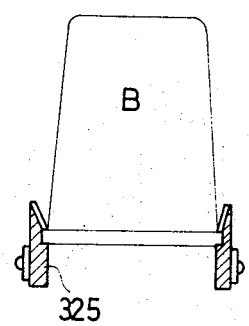
Fig. 7    Fig. 8

DEVICE FOR PLACING CUPS ON A MOVING CARRIER MEMBER

SUMMARY OF THE INVENTION

The present invention is directed to a device for transferring cup-shaped members, such as conical cups, from a stationary stack of the nested members to a continuously rotating member containing carrier members adapted to fit into the cup-shaped members and, more particularly, the invention concerns a pivotally mounted gripping member for swinging the cup-shaped members into position on the carrier member.

In the past, a rotating carrier wheel having a plurality of mandrels or carrier members for cups and the like have been used for moving the cups past a printing cylinder so that a design or text is printed on the outer surface of the cups. In transferring the cups to the mandrels, the carrier wheel has been provided with an intermittent movement so that the printing process and the placement of the cups on the mandrels was effected while the carrier wheel was stationary. Such intermittent movement of the carrier wheel limits the output of the cup printing operation.

Therefore, it is the primary object of the present invention, to provide an arrangement for transferring cups to a continuously rotating carrier wheel.

In accordance with the present invention, an oscillating gripping member is arranged for pivotal movement between a stationary stack of nested cups into the path of movement of the carrier members or mandrels on a continuously rotating carrier wheel. As each cup is pivoted toward the carrier wheel, the plane of its opening is oriented so that it extends obliquely to the axis of the carrier member whereby the carrier member can enter into the opening in the cup and, as it continues its movement, remove the cup from the gripping member.

Though the gripping member places the cup on the carrier member, it does not seat it securely in place. Therefore, it is advantageous to provide another pivotally mounted member which operates in cooperation with the gripping member for firmly seating the cup on the carrier member after the cup has been removed from the gripping member by the carrier member.

The various features of novelty which characterize the invention are pointed out with particularity in the claims annexed to and forming a part of this disclosure. For a better understanding of the invention, its operating advantages and specific objects attained by its use, reference should be had to the accompanying drawings and descriptive matter in which there is illustrated and described a preferred embodiment of the invention.

BRIEF DESCRIPTION OF THE DRAWINGS

In the drawings:

FIGS. 2 to 5 are a series of views showing the position of parts of the device as a cup is moved onto a carrier member on the carrier wheel;

FIG. 6 is a detailed front view of a portion of the device shown in FIG. 1;

FIG. 7 is a partial top view of the device shown in FIG. 6; and

FIG. 8 is a view, partly in section, taken along the line VIII—VIII of FIG. 7.

DETAILED DESCRIPTION OF THE INVENTION

Figure 1:
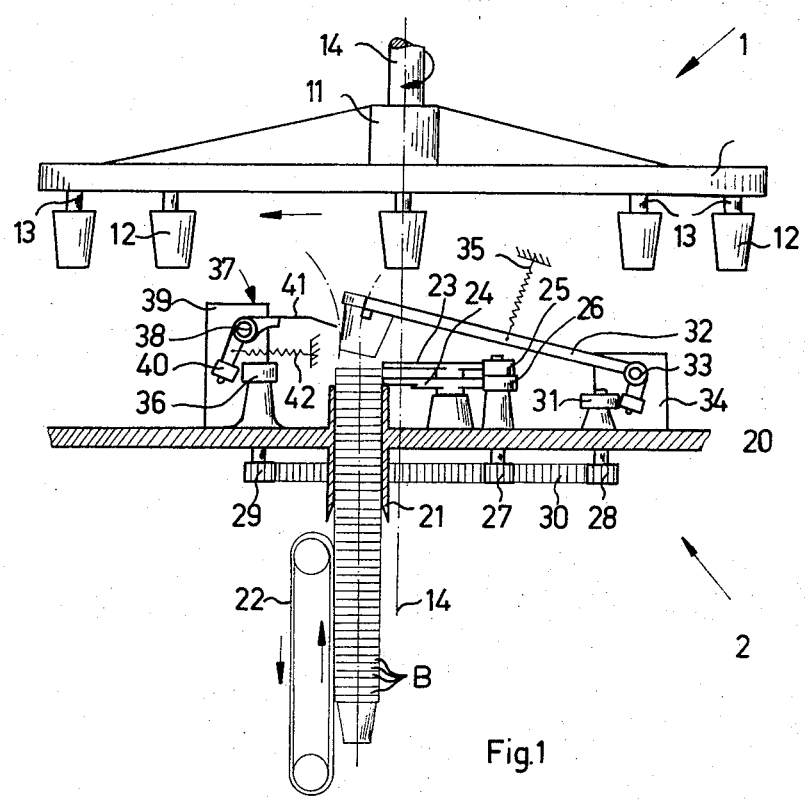
FIG. 1 is a top view, partly in section, of a carrier wheel and of a device embodying the present invention for transferring cups to carrier members on the carrier wheel.

In FIG. 1 a carrier wheel 1 and a cup transferring device 2 are shown for withdrawing cups from a stack for placement on mandrels or carrier members 12 on the wheel 1. The carrier wheel 1 has a rim 10 at its periphery and a hub 11 at its center. Arranged at regularly spaced intervals about the rim are the mandrels 12. Each of the mandrels rotates about its own axis 13 so that a cup positioned on the mandrel can be printed on its circumferential surface. The carrier wheel 1 rotates continuously in the direction of the arrows.

The cup transferring device 2 includes a mounting plate 20 on which all of the parts of the device are mounted or supported. Extending perpendicularly of the plate 20 is a cup feeding mechanism which includes a feed passage or guideway 21 in which a stationary stack of nested cups B are positioned. The stack of cups is constantly moved in the direction of the carrier wheel 1 by a conveyor belt 22. (Though in the actual embodiment of the device the belt is located under the stack of cups, in FIG. 1, for sake of clarity it is shown alongside the stack). At the outlet end of the feed passage 21 two retaining fingers 23, 24 are positioned for alternately releasing the leading cup and retaining the following cup in the stack or for retaining the leading cup and releasing the following cup. The retaining fingers 23, 24 are each controlled by a different cam disk 25, 26 and the cam disks are driven by a toothed wheel 27 located on the opposite side of the plate 20 from the disks. The wheel 27 along with the wheels 28 and 29, are driven by a toothed belt 30. The wheel 28 drives cam disk 31 which imparts an oscillating movement to a cup gripping member 32. A fuller description of the gripping member 32 is provided in the description of FIGS. 6 to 8. Secured to and extending outwardly from the plate 20 are a pair of plates 34 with an axis or pivot pin 33 extending between the plates and in substantially parallel relationship with the surface of the plate 20.

As is shown more clearly in FIG. 6, the gripping member 32 has a hub 321 mounted on the pivot pin 33 between the plates 34. An arm extends from the hub toward the plate 20 and has a roller 322 rotatably mounted at its end. As shown in FIG. 1, the roller 322 bears against the cam disk 31. Attached to the gripping member 32 intermediate its ends is a tension spring 35 which maintains the roller 322 in constant contact with the cam disk 31. The spring 35 determines the force with which the gripping member is biased toward the carrier wheel 1. Secured to the hub adjacent its opposite ends are a pair of arms 323 which extend from the hub toward the position of the cups in the feed passage 21. Secured to the ends of the arms 323 spaced outwardly from the hub are leaf spring members 324 which project from the ends of the arms toward the location of the feed passage 21. On the outer or free end of each of the springs 324 is a claw 325. As is shown in FIGS. 6 to 8 and particularly in FIG. 8, the claws are shaped so that they can grasp the edge of a cup B about its opening and remove it in the axial direction from the stack of cups positioned in the feed passage. When a cup held between the claws 325 is moved in the lateral direction as indicated by the arrow x in FIG. 7, the cup can be easily removed from between the claws due to the resilient holding action afforded by the leaf springs 324 on the ends of the arms 323.

Similar to the wheel 28, the wheel 29 has an extension which passes through the plate 20 and drives a cam disk 36 which imparts an oscillating movement to a cup applying member 37. The cup applying member pivots about an axis or pin 38 which is mounted between the plates 39 and extends in parallel with the surface of the plate 20. The plates 39 are secured to and extend outwardly from the surface of the plate 20. Extending from the pin 38 toward the cam disk 36 is a arm with a rotating roller 40 which bears against the periphery of the cam disk. Extending in the opposite direction from the pin is another arm with a leaf spring 41 positioned at its outer end. A tension spring 42 is secured to the arm containing the roller 40 and biases the roller against the periphery of the cam disk 36.

The toothed belt 30 is driven in synchronization with the carrier wheel 1 in an exactly determined transmission ratio. For example, if the carrier wheel 1 is equipped with eight mandrels, the gripping member 32 and the applying member 37 each perform eight strokes during one complete revolution of the wheel 1. Further, it would be advantageous to provide two gripping members and applying members which alternately attach the cups to alternate ones of the mandrels. In such an arrangement, each combination of one gripping member and one applying member would perform strokes during each revolution of the wheel 1. The drive for the toothed belt 20 is effected by a toothed driving wheel, not shown, which is arranged on the shaft 14 of the carrier wheel 1. For clarity's sake, only the center line of the shaft 14 is shown by way of a broken line in the range of the cup transferring device 2.

Figures 2, 3:
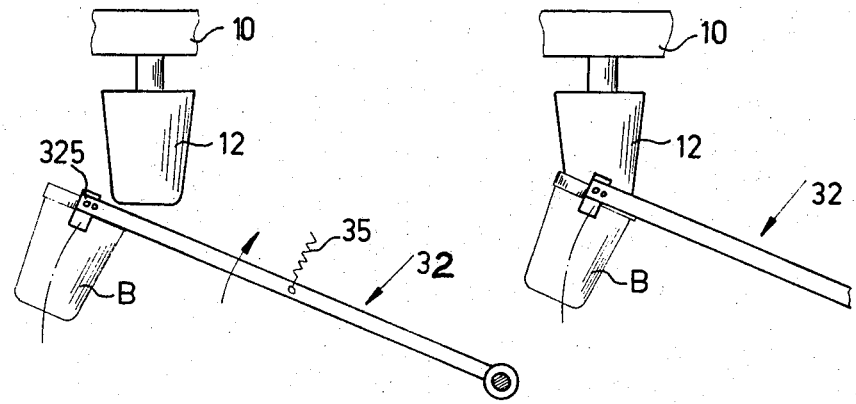

As mentioned above, in the operation of the device, the stack of cups B is constantly moved and the leading cup in the stack is engaged by the gripping member 32 when it is released by the retaining member 23. As the gripping member 32 performs its return movement, that is away from the carrier wheel 1, the claws 325 are shaped so that their bevel edges move over the edge of the cup and the edge is gripped by a recess in the claws. The cam disk 31 holds the gripping member 32 in position at the outlet end of the feed passage 21 for gripping the leading cup and when the cam disk releases the gripping member, the spring 35 biases the arms 323 about the pivot pin 33 in the direction of the carrier wheel 1, note FIG. 1. As the cup is swung toward the mandrel 12, it is located forwardly or downstream of the mandrel. As can be seen in FIG. 2, as the cup B held by the claws 325 on the ends of the arms 323 approaches the path of movement of the mandrels, the cup is still located forwardly or downstream of the mandrel onto which the cup is to be placed. Initially, the axis of the cup and the axis of the mandrel are in parallel relationship. However, as the cup is swung toward the wheel 1 by the gripping member 32, its axis is tipped relative to the axis of the mandrel and the plane of the opening of the cup is disposed at an oblique angle to the axis of the mandrel. In this inclined or angularly oriented position, the opening of the cup is arranged so that the end of the mandrel can easily move into the cup. This characteristic can be particularly noted in FIG. 3 in which the spring action has moved the cup into the path of the mandrel so that the outer end of the mandrel enters through the opening in the cup. This position indicates the end position of the gripping member 32 under the biasing action of the spring.

In the next step of the operation, as indicated in FIG. 4, the mandrel has continued to move and has displaced the cup B from the claws 325 in the end of the gripping member 32. As the gripping member 32 has moved the cup onto the mandrel, the applying member 37 has also pivoted about the pin 38 due to the action of the cam disc 36 and the spring 42 so that its leaf spring 41 has moved toward the carrier wheel 1 and its free end is in contact with the bottom of the cup B which has been released by the claws 325. In FIG. 5 the cup B has moved completely away from the end of the gripping member 32, which is moving back toward the plate 20, note the arrow, and the leaf spring 41 of the applying member 37 is moving the cup B onto the mandrel 12 as the carrier wheel 1 continues to rotate.

In practice, the final seating of the cup B on the mandrel 12 is effected by means of a vacuum pump which completes the seating of the cup by a suction action during the further movement of the carrier wheel 1.

While a specific embodiment of the invention has been shown and described in detail to illustrate the application of the inventive principles, it will be understood tht the invention may be embodied otherwise without departing from such principles.

What is claimed is:

1. A device for removing a cup-like member from a stationary position and placing it on a moving carrier member comprising a support means forming a pick-up station at which the cup-like members to be moved to the moving carrier member are held in a stationary position with the openings of the cup-like members facing in the direction of the moving carrier member, said support means including a support surface extending substantially normally of the axial direction of the cup-like members in the stationary position, means for releasably gripping individual cup-like members at the pick-up station and for pivoting the members outwardly away from the said support surface through an arc into the path of the moving carrier member so that the plane of the opening of the cup-like member held by said gripping means is disposed at an oblique angle to its axis in the stationary position whereby the carrying member enters the opening in the cup-like member and removes the cup-like member from said gripping means as said carrier member continues in its path of movement.

2. A device, as set forth in claim 1, wherein said support means includes a holder for holding a stack of the cup-like members in the stationary position at the pick-up station, and movably displaceable retaining members located at the pick-up station for alternately releasing and holding the leading cup-like member and the following cup-like member at the end of the stack of said cup-like members from which the cup-like members are removed for placement on the moving carrier member.

3. A device, as set forth in claim 2, including applying means operating in cooperation with said means for gripping the cup-like member for pushing the cup-like member onto the moving carrier member after it has been released by said means for gripping the cup-like member.

4. A device, as set forth in claim 3, including means for synchronizing the movement of said gripping means and said applying means relative to the movement of said moving carrier member.

5. A device, as set forth in claim 2, wherein said means for releasably gripping individual cup-like members comprises a pair of laterally spaced arms pivotally mounted at one end on said support surface at a position spaced laterally from the pick-up station, a spring member attached to and projecting from the opposite end of each said arm from the pivotally mounted end and a claw attached to the end of said spring member spaced from said arm, said spring members biasing said claws toward one another, said claws arranged to grip in a releasable manner the surface of a cup-like member adjacent the opening therein, and said spring members arranged with said claws for releasing a cup-like member when the cup-like member is placed on the moving carrier member.

6. A device, as set forth in claim 5, wherein said means for releasably gripping individual cup-like members includes a first cam in engagement with the pivotally mounted ends of said arms, and a spring attached to said arms for biasing them in the direction of the carrier member, said first cam arranged to displace the ends of said arms containing said claws into he pick-up station against the biasing action of said spring so that after a cup-shaped member has been gripped said cam releases said arms and said spring biases said arms for pivotal movement into position for transferring a cup-shaped member to a moving carrier member.

7. A device, as set forth in claim 6, including a pair of plates secured to and extending perpendicularly from said support surface, a pivot pin extending between said plates in substantially parallel relationship with said support surface, said arms pivotally mounted on said pin, said cam mounted on said suppor surface adjacent to said plates, and said synchronizing means in operative engagement with said cam for timing the operation of said cam relative to the movement of said carrier member.

8. A device, as set forth in claim 7, wherein a pair of cam disks is mounted on said support surface and each said cam disk is in contact with a different one of said retaining members, said synchronizing means in operative engagement with said cam disks for effecting the alternating release and holding of said cup-like members arranged to be picked-up by said arms from the pick-up station.

9. A device, as set forth in claim 3, wherein said applying means comprises plates secured to and extending substantially perpendicularly from said support surface, a pivot pin mounted in said plates and disposed substantially parallel to said support surface, and applying member pivotally mounted on said pin, a spring connected to said applying member for biasing it toward the moving carrier member and a second cam mounted on said support surface and in contacting engagement with said applying member for regulating the movement of said applying member toward the moving carrier member.

10. A device, as set forth in claim 9, including a leaf spring applying arm fixed to said applying member and arranged to pivot with said applying member into contact with a cup-shaped member placed on the moving carrier member by said gripping means for pushing the cup-shaped member onto the moving carrier member.

11. A device, as set forth in claim 1, including means for continuously moving the cup-shaped members into the pick-up station.

* * * * *